(12) United States Patent
Hasegawa et al.

(10) Patent No.: US 10,585,234 B2
(45) Date of Patent: Mar. 10, 2020

(54) COUPLED MULTICORE OPTICAL FIBER AND OPTICAL TRANSMISSION SYSTEM INCLUDING SAME

(71) Applicant: SUMITOMO ELECTRIC INDUSTRIES, LTD., Osaka-shi, Osaka (JP)

(72) Inventors: Takemi Hasegawa, Yokohama (JP); Tetsuya Hayashi, Yokohama (JP); Yoshiaki Tamura, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 16/154,779

(22) Filed: Oct. 9, 2018

(65) Prior Publication Data

US 2019/0041574 A1    Feb. 7, 2019

Related U.S. Application Data

(63) Continuation of application No. PCT/JP2017/017720, filed on May 10, 2017.

(30) Foreign Application Priority Data

May 10, 2016    (JP) ................. 2016-094345

(51) Int. Cl.
*G02B 6/28* (2006.01)
*G02B 6/02* (2006.01)
(Continued)

(52) U.S. Cl.
CPC ....... *G02B 6/02042* (2013.01); *G02B 6/2551* (2013.01); *G02B 6/2552* (2013.01); *G02B 6/3885* (2013.01); *G02B 6/262* (2013.01)

(58) Field of Classification Search
CPC .................................................. G02B 6/2848
(Continued)

(56) References Cited

U.S. PATENT DOCUMENTS

| 6,097,869 A | 8/2000 | Chang et al. |
| 9,857,536 B2 * | 1/2018 | Kopp ................. G02B 6/30 |

(Continued)

FOREIGN PATENT DOCUMENTS

| JP | H2-136807 A | 5/1990 |
| JP | 2016-033627 A | 3/2016 |
| JP | 2016-033642 A | 3/2016 |

OTHER PUBLICATIONS

R. Ryf, et al., "1705-km Transmission over Coupled-Core Fibre Supporting 6 Spatial Modes," ECOC 2014, Cannes-France PD.3.2, 2014, 3 pages.

(Continued)

*Primary Examiner* — Eric Wong
(74) *Attorney, Agent, or Firm* — Drinker Biddle & Reath LLP

(57) ABSTRACT

The present embodiment relates to a CC-MCF capable of generating sufficient mode coupling even with bending or twisting less. The CC-MCF includes two fiber parts having cores mutually directly or indirectly connected, each fiber part having a plurality of cores in which a pair of adjacent cores has a mode-coupling coefficient of 1 (1/m) or more. Each fiber part is provided with a transition section including a fiber end face and a stationary section adjacent to the transition section. In the stationary section, the MFD of each core is substantially constant in a fiber longitudinal direction, and in the transition section, the MFD of each core is continuously expanding from the stationary section to the fiber end face.

8 Claims, 6 Drawing Sheets

(51) Int. Cl.
*G02B 6/255* (2006.01)
*G02B 6/38* (2006.01)
*G02B 6/26* (2006.01)

(58) Field of Classification Search
USPC .............................................. 385/15, 31, 43
See application file for complete search history.

(56) References Cited

U.S. PATENT DOCUMENTS

2003/0035630 A1  2/2003 Meltz
2004/0114886 A1  6/2004 Christensen et al.

OTHER PUBLICATIONS

Hayashi, Tetsuya, et al., "Coupled-Core Multi-Core Fibers: High-Spatial-Density Optical Transmission Fibers with Low Differential Modal Properties," Proc. ECOC 2015, We.1.4.1, 2015, 3 pages.
Koshiba, Masanori, et al., "Multi-core fiber design and analysis: coupled-mode theory and coupled-power theory," Optics Express vol. 19, No. 26, 2011, p. B102-p. B111.

\* cited by examiner

COUPLED MULTICORE OPTICAL FIBER AND OPTICAL TRANSMISSION SYSTEM INCLUDING SAME

CROSS-REFERENCE TO RELATED APPLICATIONS

This application is a continuation application of PCT/JP2017/017720 claiming the benefit of priority of the Japanese Patent Application No. 2016-094345 filed on May 10, 2016, the entire contents of which are incorporated herein by reference.

TECHNICAL FIELD

The present invention relates to a coupled multicore optical fiber and an optical transmission system including the coupled multicore optical fiber.

BACKGROUND ART

Patent Documents 1 and 2 each disclose a technique relating to a coupled multicore optical fiber.

CITATION LIST

Patent Literature

Patent Document 1: U.S. Patent Application Laid-Open No. 2004/0114886

Non-Patent Literature

Non-Patent Document 1: Tetsuya Hayashi, et al., "Coupled-Core Multi-Core Fibers: High-Spatial-Density Optical Transmission Fibers with Low Differential Modal Properties," Proc. ECOC 2015, We.1.4.1 (2015)

Non-Patent Document 2: Masanori Koshiba et al., "Multi-core fiber design and analysis: coupled-mode theory and coupled-power theory," Optics Express Vol. 19, No. 26, pp. B102-B111 (2011)

SUMMARY OF INVENTION

Technical Problem

The inventors have found the following problem as a result of examination of a conventional coupled multicore optical fiber. Namely, a multicore optical fiber including a plurality of cores provided in one optical fiber (hereinafter, referred to as a "multi core fiber (MCF)") is expected as a technique of improving the spatial density of information transmission capacity to improve the utilization efficiency of the sectional area of a limited communication channel, such as an underground conduit or a submarine cable. Particularly, a coupled multicore optical fiber that performs guided mode coupling between a plurality of cores (hereinafter, referred to as a coupled-core multi core fiber (CC-MCF)), can further improve the spatial density of information transmission capacity because the distance between the cores is small.

For the CC-MCF, a multi-input multi-output (MEMO) signal processing technique is required in order to distinguish signals in a plurality of guided modes propagating through the coupled cores. The computational complexity of MIMO signal processing increases as inter-mode differential mode delay (DMD) increases, but appropriately setting inter-core coupling strength can inhibit the DMD from increasing. That is, if the inter-core coupling strength is appropriately set, the difference in inter-mode group velocity can be reduced. Furthermore, if mode coupling generated by bending or twisting occurring in an optical fiber in practical use randomizes the accumulation of DMD, the accumulating rate of the DMD can be reduced from a value proportional to the first power of fiber length to a value proportional to the one-half power of fiber length. Such an MCF is called a coupled-mode coupled-core multi core fiber (hereinafter, referred to as a "CM-CC-MCF") (for example, refer to Non-Patent Document 1). The CM-CC-MCF typically has an inter-core mode-coupling coefficient of 1 [1/m] or more or an inter-core power-coupling coefficient of 10 [1/km] or more.

However, in order to apply the CC-MCF to the CM-CC-MCF, it is necessary that generation of sufficient bending or twisting in practical use promotes mode coupling. Use of the CC-MCF with bending or twisting less causes the mode coupling to be insufficient, and thus there is a problem that the DMD increases.

The present invention has been made in order to solve the problem described above, and an object of the present invention is to provide a CC-MCF capable of generating sufficient mode coupling even when the CC-MCF is used with bending or twisting less.

Solution to Problem

In order to solve the problem described above, a coupled multicore optical fiber (CC-MCF) according to the present embodiment includes first and second fiber parts each having: a plurality of cores extending along a central axis; a single cladding surrounding the plurality of cores; a coating surrounding the single cladding; and a connected end face at which respective first end faces of the plurality of cores are disposed. The first end faces of the plurality of cores in the first fiber part are mutually directly or indirectly connected to the first end faces of the plurality of cores in the second fiber part. Particularly, because the first and second fiber parts each include a coupled multicore optical fiber, the first fiber part is referred to as a first CC-MCF and the second fiber part is referred to as a second CC-MCF. In each of the first and second CC-MCFs, a pair of adjacent cores in the plurality of cores has a mode-coupling coefficient of 1 [1/m] or more. Furthermore, the first and second CC-MCFs each have: a transition section including the connected end face; and a stationary section disposed adjacently to the transition section along the central axis. Note that the stationary section has respective mode-field diameters of the plurality of cores, substantially constant along the central axis (hereinafter, referred to as "MFDs"), and the transition section has the respective MFDs of the plurality of cores, continuously expanding from the stationary section to the connected end face.

Advantageous Effects of Invention

The CC-MCF according to the present embodiment is capable of generating sufficient mode coupling even when the CC-MCF is used with bending or twisting less.

DESCRIPTION OF EMBODIMENTS

Descriptions of Embodiment of Present Invention

Figure 1:
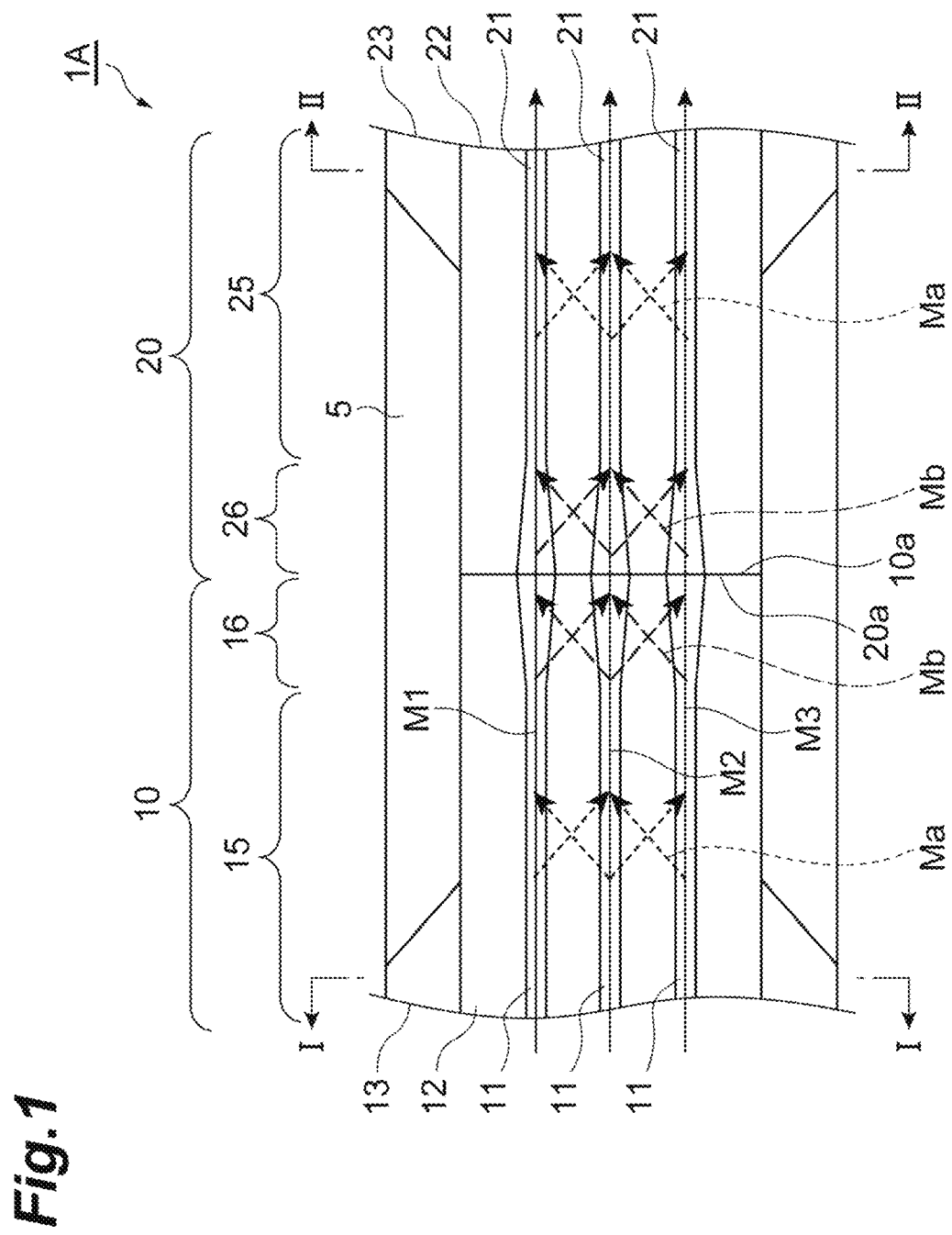
FIG. 1 is a schematic view of the sectional structure along the central axis of a CC-MCF according to a first embodiment.

The descriptions of an embodiment of the present invention will be first individually described below.

(1) A coupled multicore optical fiber (CC-MCF) according to the present embodiment, as one aspect, includes first and second CC-MCFs (first and second fiber parts) each having: a plurality of cores extending along a central axis; a single cladding surrounding the plurality of cores; a coating surrounding the single cladding; and a connected end face at which respective first end faces of the plurality of cores are disposed. The first end faces of the plurality of cores in the first CC-MCF are mutually directly or indirectly connected to the first end faces of the plurality of cores in the second CC-MCF. In each of the first and second CC-MCFs, a pair of adjacent cores in the plurality of cores has a mode-coupling coefficient of 1 [1/m] or more. Furthermore, the first and second CC-MCFs each have: a transition section including the connected end face; and a stationary section disposed adjacently to the transition section along the central axis. Note that the stationary section has the respective MFDs of the plurality of cores, substantially constant along the central axis, and the transition section has the respective MFDs of the plurality of cores, continuously expanding from the stationary section to the connected end face.

(2) In the CC-MCF according to the present embodiment, each of the first and second CC-MCF has the transition section including the connected end face. In the transition section, the respective MFDs of the plurality of cores continuously vary such that the respective MFDs expand from the stationary section side to the connected end face. Thus, the mode-field overlap between the adjacent cores increases, so that the mode-coupling coefficient continuously increases from the stationary section side to the connected end face. Then, the continuous increase of the mode-coupling coefficient allows strong mode coupling to occur. Therefore, the CC-MCF according to the present embodiment can generate sufficient mode coupling even when the CC-MCF is used with bending or twisting less. As a result, the accumulation of DMD can be delayed to reduce the DMD.

(3) As one aspect of the present embodiment, the length of the transition section in at least one of the first and second CC-MCFs is preferably three times or more the outer diameter of the cladding. This arrangement can inhibit transmission loss from increasing due to mode mismatching. In addition, the respective MFDs at the connected end face of the plurality of cores in the transition section are preferably 1.5 times or more the respective MFDs of the plurality of cores in the stationary section. This arrangement can generate sufficiently strong mode coupling.

(4) The CC-MCF according to the present embodiment, as one aspect, may further include a third CC-MCF disposed between the first and second CC-MCFs. The third CC-MCF has: a first fiber end face; a second fiber end face opposed to the first fiber end face; a plurality of cores extending from the first fiber end face to the second fiber end face; a single cladding surrounding the plurality of cores; and a coating surrounding the single cladding. The plurality of cores each has: a first end face disposed on the first fiber end face; and a second end face disposed on the second fiber end face. In the third CC-MCF, a pair of adjacent cores in the plurality of cores has a mode-coupling coefficient of 1 [1/m] or more. In the configuration including the first to third CC-MCFs, the first end faces of the plurality of cores in the third CC-MCF are mutually directly connected to the first end faces of the plurality of cores in the first CC-MCF. The second end faces of the plurality of cores in the third CC-MCF are mutually directly connected to the first end faces of the plurality of cores in the second CC-MCF. Furthermore, the respective MFDs of the plurality of cores in the third CC-MCF are preferably substantially equal to the respective MFDs at the connected end face of the plurality of cores in each of the first and second CC-MCFs. One-by-one optical connection between the respective cores in the first and second CC-MCFs through the third CC-MCF, can inhibit transmission loss from increasing due to mode mismatching.

(5) As one aspect of the present embodiment, in each of the first to third CC-MCFs, each of the plurality of cores is comprised of silica glass; the single cladding is comprised of silica glass doped with fluorine (F); and the coating is comprised of ultraviolet curable resin. The fluorine distribution of the transition section in each of the first and second CC-MCFs, varies along the central axis. Furthermore, as one aspect of the present embodiment, an edge section of each of the first and second CC-MCFs, may be provided with, instead of the coating, a recoating including ultraviolet curable resin. In this case, the CC-MCF preferably has a breaking strength of 200 kgf or more. Note that the edge section means a section including the transition section and part of the stationary section adjacent to the transition section, the section having the coating removed.

(6) An optical transmission system according to the present embodiment, preferably includes: an optical transmitter; an optical receiver; and a CC-MCF having the structure described above (CC-MCF according to the present embodiment). The optical transmitter outputs a modulated optical signal. The optical receiver receives the optical signal output from the optical transmitter. The CC-MCF according to the present embodiment, optically couples the optical transmitter and the optical receiver. Particularly, the CC-MCF according to the present embodiment, transmits the optical signal and gives mode coupling to the optical signal, simultaneously. The optical receiver performs coherent detection to the optical signal subjected to the mode coupling, and restores, with MIMO signal processing, the optical signal before the mode coupling.

(7) The optical transmission system including the CC-MCF according to the various aspects, suppresses the accumulation of DMD low even in long-haul transmission, and reduces the computational complexity of the MIMO signal processing in the optical receiver. As a result, signal delay and power consumption due to the signal processing are reduced.

Each aspect described in the section of "Descriptions of Embodiment of Present Invention" can be applied to each of the remaining all aspects or all combinations of the remaining aspects.

Detail of Embodiment of Present Invention

The respective specific structures of the CC-MCF and the optical transmission system according to the present embodiment, will be described in detail below with reference to the accompanying drawings. Note that the present invention is not limited to these exemplifications, and thus it is intended that the present invention is indicated in the scope of the claims and includes all alterations in the meaning and the scope equivalent to the scope of the claims. The same elements are denoted with the same reference signs in the descriptions of the drawings, and thus the duplicate descriptions thereof will be omitted. Note that, in the following descriptions, an optical characteristic defined by an individual core (optical characteristic of each core) means an optical characteristic occurring in a case where, in consideration of one core, it is assumed that the other cores are not present.

First Embodiment

Figure 2:
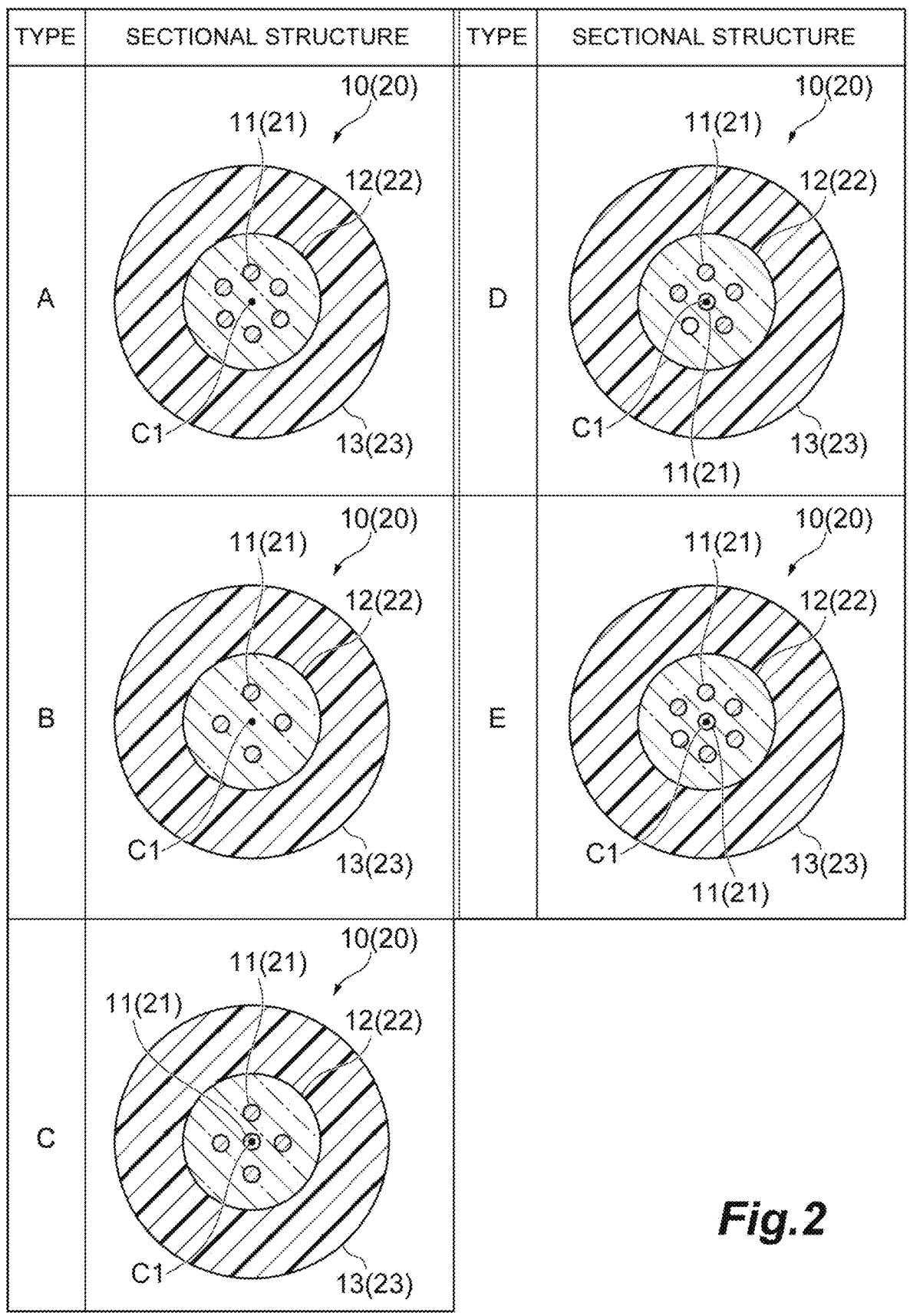
FIG. 2 illustrates sectional views taken along line I-I and line II-II of FIG. 1, the sectional views being various exemplary sectional structures of first and second CC-MCFs.

FIG. 1 is a schematic view of the sectional structure along the central axis of a CC-MCF 1A according to a first embodiment. FIG. 2 illustrates exemplary sectional configurations perpendicular to the central axis of CC-MCFs 10 and 20 included in the CC-MCF 1A. As illustrated in FIG. 1, the CC-MCF 1A according to the present embodiment includes: the CC-MCF 10 (first CC-MCF) corresponding to a first fiber part; and the CC-MCF 20 (second CC-MCF) corresponding to a second fiber part. Note that FIG. 2 illustrates various exemplary sectional structures of the CC-MCFs 10 and 20 taken along line I-I and line II-II of FIG. 1. The CC-MCFs 10 and 20 illustrated in FIG. 1 each have a type-A sectional structure.

Note that the CC-MCF 10 has: a transition section 16 including an end face 10a (connected end face); and a stationary section 15 disposed adjacently to the transition section 16 along the central axis. The CC-MCF 20 has: a transition section 26 including an end face 20a (connected end face); and a stationary section 25 disposed adjacently to the transition section 26 along the central axis. The stationary sections 15 and 25 have the respective MFDs of cores 11 and 21, substantially constant along the central axis. The transition sections 16 and 26 have the respective MFDs of the cores 11 and 21, varying along the central axis. In the following descriptions, mention of the respective structures of the CC-MCFs 10 and 20 means the state before the formation of the transition sections 16 and 26, namely, the structures of the stationary sections 15 and 25.

As illustrated in type A of FIG. 2, the CC-MCF 10 has: a plurality of cores 11 disposed surrounding the central axis C1 (a line passing through the center in section of the CC-MCF 10); a single cladding 12 surrounding the plurality of cores 11; and a coating 13 surrounding the single cladding 12. Similarly, the CC-MCF 20 has: a plurality of cores 21 disposed surrounding the central axis C1; a single cladding 22 surrounding the plurality of cores 21; and a coating 23 surrounding the single cladding 22. The disposition of the plurality of cores 11 is mutually identical to the disposition of the plurality of cores 21. Type A illustrated in FIG. 2 has six cores 11 (21) surrounded by the cladding 12 (22), disposed substantially symmetrically at equiangular intervals around the central axis C1. The cladding 12 (22) and the coating 13 (23) are disposed substantially concentrically, centering on the central axis C1. Note that the number of cores and the disposition thereof are not limited to the above descriptions, and thus, as illustrated in types B to E of FIG. 2, the number of cores may be any of four to seven and a core 11 (21) may be provided on the central axis C1. Particularly, the dispositions of types C to E each having a core 11 (21) on the central axis C1, are preferable in that mode coupling is enhanced between the cores opposed across the central axis in each of the CC-MCFs 10 and 20; the uniformity improves in inter-mode optical characteristic; and the MIMO processing described above functions more effectively.

The cores 11, 21 and the claddings 12, 22 are comprised of silica glass doped with Ge or F, as a main component. Particularly, the claddings 12 and 22 are preferably doped with F ranging from 4000 to less than 20000 ppm, more preferably from 8000 to less than 16000 ppm. F is fast in diffusion rate and has a large effect of lowering the refractive index of glass. Thus, heating of an optical fiber and diffusing of F enable the MFD to vary efficiently. Note that the cores 11 and 21 and the claddings 12 and 22 may each contain chlorine (Cl) mixed at a dehydrating process during preform preparation. The cores 11 and 21 and the claddings 12 and 22 may each contain an alkali metal or an alkaline earth metal, such as Na, K, Rb, Cs, or Ca, having an effect of lowering the viscosity of glass. The coatings 13 and 23 each include ultraviolet curable resin. The coatings 13 and 23 each may include a plurality of layers. For example, a configuration in which respective layers (inner) on the cladding 12 and 22 sides are lower in Young's modulus than outer layers (for example, respective outermost layers), can attenuate a component that acts on glass parts (the cores 11 and 21 and the claddings 12 and 22) and generates microbending, from random external force that acts on the outer circumferences of the CC-MCFs 10 and 20. The respective outermost layers of the coatings 13 and 23 to be viewed from outside are colored, so that the CC-MCFs 10 and 20 can be easily identified.

In the stationary sections 15 and 25 in the CC-MCF 1A (CC-MCF before the formation of the transition sections 16 and 26), the cores 11 and 21 each have, for example, a diameter of 6 to 18 μm. This arrangement enables a base mode defined in each individual of the cores 11 and 21, to propagate, the base mode being confined with appropriate strength. Furthermore, attenuating of a higher-order mode by fiber bending prevents the higher-order mode from propagating, so that DMD can be prevented from increasing. The claddings 12 and 22 each have, for example, an outer diameter of 124 to 126 μm. This arrangement facilitates connection to a widely-used optical connector. The coatings 13 and 23 each have, for example, an outer diameter of 240 to 260 μm. This arrangement can inhibit loss from increasing due to intermittent microbending occurring in practical use.

The interval between the adjacent cores (core interval) is preferably not less than the core diameter to not more than 30 μm. The mode-coupling coefficient between the adjacent cores 11 in the CC-MCF 10 and the mode-coupling coefficient between the adjacent cores 21 in the CC-MCF 20 are each 1 [1/m] or more. Alternatively, the power-coupling coefficient between the adjacent cores 11 in the CC-MCF 10 and the power-coupling coefficient between the adjacent cores 21 in the CC-MCF 20 are each 10 [1/1 cm] or more. Here, the "core interval" is prescribed by the length of a line segment connecting the centers of cores. Adjacent cores indicate a set of cores in which a line segment connecting the centers of the cores in the set does not intersect a line segment connecting the centers of the cores in any of the other sets (not in contact with the line segments of the other sets, except both ends of the line segment of the set). The "mode-coupling coefficient" is the ratio in complex amplitude of a component that couples, when a mode propagates over a unit length, with a different mode. More particularly, as described in Non-Patent Document 2, the "mode-coupling coefficient" is defined as a coefficient in a mode coupling equation. In order to simplify description in the present specification, the mode-coupling coefficient between the base modes in the adjacent cores, is referred to as the mode-coupling coefficient between the cores. The "power-coupling coefficient" is the ratio in power of a component that couples, when a mode propagates over a unit length, with a different mode. More particularly, as described in Non-Patent Document 2, the "power-coupling coefficient" is defined as a coefficient in a power coupling equation. In order to simplify description in the present specification, the power-coupling coefficient between the base modes in the adjacent cores, is referred to as the power-coupling coefficient between the cores. Furthermore, the cores 11 and 21 may extend spirally along the central axis C1, centering on the central axis C1. The cycle of the spiral is, for example, 0.5 (m) or less. This arrangement generates the mode coupling efficiently, so that the accumulating rate of the DMD can be reduced to a rate proportional to the one-half power to the seven-tenth power of fiber length.

The end face 10*a* of the CC-MCF 10 and the end face 20*a* of the CC-MCF 20 are mutually connected by, for example, fusing with adjustment in angle around the central axis C1. This arrangement allows each core 11 at the end face 10*a* and each core 21 at the end face 20*a* to be mutually directly connected. At this time, technically, the disposition of the cores 11 of the CC-MCF 10 and the disposition of the cores 21 of the CC-MCF 20 often do not agree with each other. Thus, the two CC-MCFs 10 and 20 are preferably connected with the adjustment in angle around the central axis such that the mean value of absolute values in positional discrepancy between the cores corresponding one by one (discrepancy between the centers of the cores) is minimized. More preferably, the mean value of absolute values in positional discrepancy is preferably 2 µm or less, or, 1 µm or less. Note that the coatings 13 and 23 are removed, for the fusion-connection, from a section having a predetermined length, including the end faces 10*a* and 20*a*. However, after the fusion-connection, a recoating 5 including ultraviolet curable resin is formed on the section from which the coatings 13 and 23 have been removed, so that the recoating 5 coats a fusion-connected part. Furthermore, in the present embodiment, the section including the fusion-connected part preferably has a breaking strength of 200 kgf or more. This arrangement enables the connected CC-MCF 1A according to the present embodiment to be applied to an optical cable. In order to ensure the breaking strength, the CC-MCF 1A is preferably subjected to screening in which a tension of 200 kgf or more is applied over 0.1 sec or more.

FIG. 1 illustrates three cores 11 and three cores 21 from the plurality of cores 11 and the plurality of cores 21. As illustrated in FIG. 1, the CC-MCF 10 has the stationary section 15 and the transition section 16. The transition section 16 including the end face 10*a* is provided between the stationary section 15 and the end face 10*a*. The stationary section 15 includes a remaining section excluding the transition section 16 from the entire section of the CC-MCF 10. The stationary section 15 has the respective MFDs of the cores 11, substantially constant along the central axis C1.

The transition section 16 has the respective MFDs of the cores 11, continuously expanding from the same size as in the stationary section 15, to the end face 10*a*. Such a variation in MFD is achieved by, for example, gradually expansion of the diameter of a core 11 from the same size as in the stationary section 15, to the end face 10*a*. Alternatively, such a variation in MFD is achieved by, for example, gradually reduction of the refractive index of a core 11 from the same level as in the stationary section 15, to the end face 10*a*. The length of the transition section 16 is, for example, three times or more, ten times or more, or 30 times or more the outer diameter of the cladding 12. The respective MFDs of the cores 11 vary 1.5 times or more (or twice or more) from the end on the stationary section 15 side of the transition section 16 to the end face 10*a*. That is, the respective MFDs of the cores 11 at the end face 10*a* are 1.5 times or more the respective MFDs of the cores 11 in the stationary section 15. The transition section 16 has the mode-field overlap between the adjacent cores 11 increasing together with the expansion of the respective MFDs of the cores 11. This arrangement allows that the mode-coupling coefficient in the transition section 16 continuously increases toward the end face 10*a*. More preferably, the transition section 16 has the cladding diameter substantially constant regardless of the variations of the MFDs of the cores 11. This arrangement prevents the breaking strength of the CC-MCF 1A from deteriorating due to stress concentration or an insufficient sectional area, so that high mechanical reliability can be achieved.

Similarly, the CC-MCF 20 has the stationary section 25 and the transition section 26. The transition section 26 including the end face 20*a* is provided between the stationary section 25 and the end face 20*a*. The stationary section 25 includes a remaining section excluding the transition section 26 from the entire section of the CC-MCF 20. The stationary section 25 has the respective MFDs of the cores 21, substantially constant along the central axis C1.

The transition section 26 has the respective MFDs of the cores 21, continuously expanding from the same size as in the stationary section 25, to the end face 20*a*. Such a variation in MFD is achieved by, for example, gradually expansion of the diameter of a core 21 from the same size as in the stationary section 25, to the end face 20*a*. Alternatively, such a variation in MFD is achieved by, for example, gradually reduction of the refractive index of a core 21 from the same level as in the stationary section 25, to the end face 20*a*. The length of the transition section 26 is, for example, three times or more, ten times or more, or 30 times or more the outer diameter of the cladding 22. The respective MFDs of the cores 21 vary 1.5 times or more (or twice or more) from the end on the stationary section 25 side of the transition section 26 to the end face 20*a*. That is, the respective MFDs of the cores 21 at the end face 20*a* is 1.5 times or more the respective MFDs of the cores 21 in the stationary section 25. The transition section 26 has the mode-field overlap between the adjacent cores 21 increasing together with the expansion of the respective MFDs of the cores 21. This arrangement allows that the mode-coupling coefficient continuously increases toward the end face 20*a*.

Note that, for example, a method of thermally diffusing a dopant, such as Ge or F, with which an optical fiber is doped with flames of combustible gas, such as propane, in order to form the refractive index distribution of the optical fiber, is effective for a method of gradually expanding the respective diameters of the cores 11 and 21 in accordance with approach to the end faces 10*a* and 20*a*. Such a method and a device that achieves the method are disclosed in Patent Document 1. For a method of gradually reducing the respective refractive indices of the cores 11 and 21 in accordance with approach to the end faces 10a and 20a, the method of thermally diffusing a dopant, such as Ge or F, can be effectively used. More preferably, diffusion of F with which the claddings 12 and 22 are doped into the cores 11 and 21 achieves at least one of the variation in core diameter and the variation in refractive index. The use of the diffusion of F faster in diffusion rate than Ge or a different element, reduces the amount of heat to be added, so that the productivity and safety of the CC-MCF 1A can improve.

Figure 6:
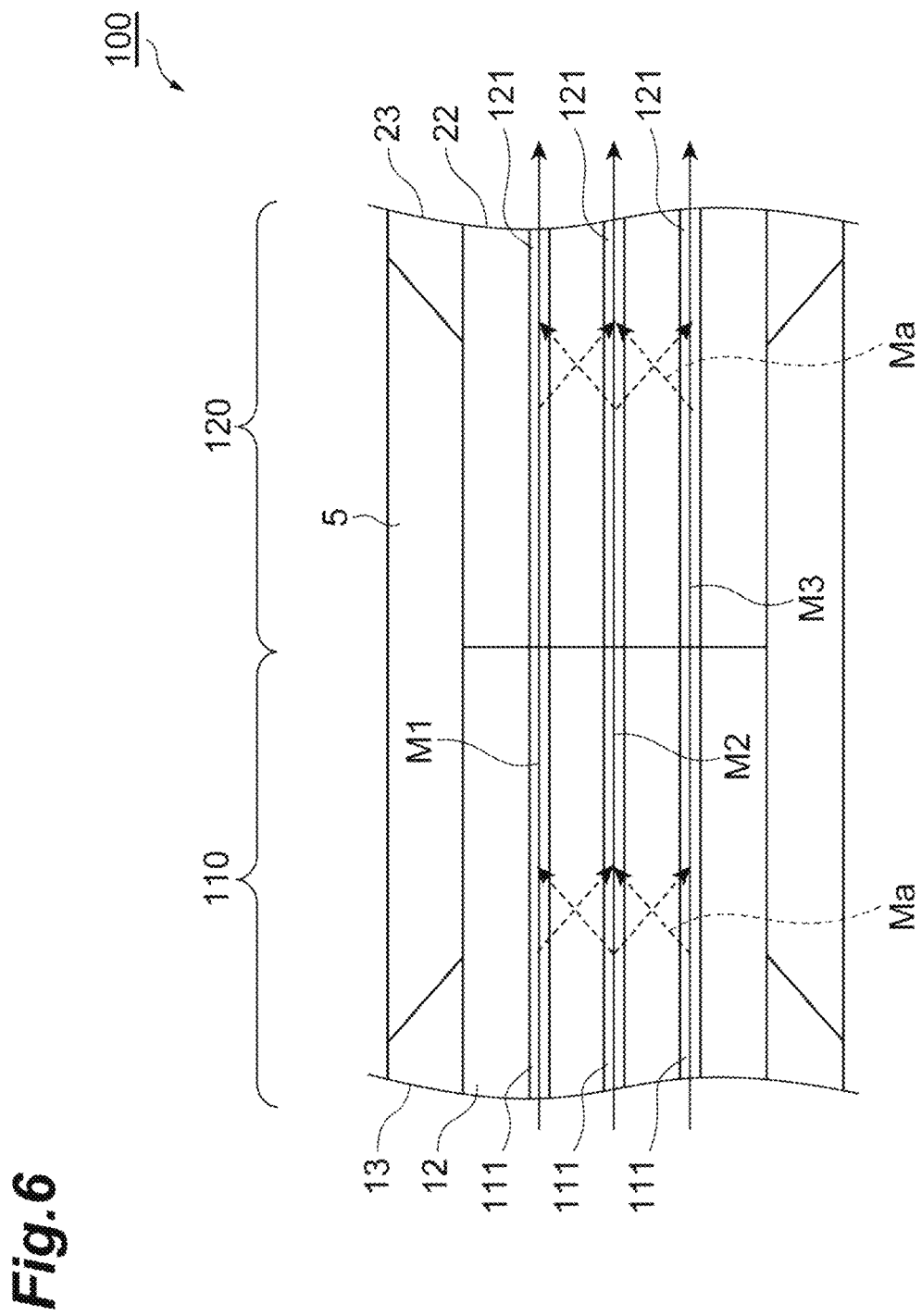
FIG. 6 is a schematic view of the sectional structure of a CC-MCF according to a comparative example.

Next, an effect acquired by the CC-MCF 1A according to the present embodiment described above, will be described. FIG. 6 is a schematic view of the sectional structure of a CC-MCF 100 according to a comparative example. The CC-MCF 100 includes CC-MCFs 110 and 120. The CC-MCF 110 has a plurality of cores 111. The CC-MCF 120 has a plurality of cores 121.

The CC-MCF 100 is different from the CC-MCF 1A according to the present embodiment in that the CC-MCFs 110 and 120 each have no transition section. That is, the entire section of the CC-MCF 110 has the respective MFDs of the cores 111, substantially constant along a central axis C1. Similarly, the entire section of the CC-MCF 120 has the respective MFDs of the cores 121, substantially constant along the central axis C1. Note that, except for this point, the configuration of the CC-MCF 100 is similar to that of the CC-MCF 1A according to the present embodiment.

In the CC-MCF 100 having the structure described above, modes M1 to M3 individually propagate through the cores 111. The modes M1 to M3 are individually incident on the cores 121 through the boundary face between the CC-MCF 110 and the CC-MCF 120, to propagate through the cores 121. The modes M1 to M3 mutually couple due to twisting that the CC-MCFs 110 and 120 each originally have or due to bending or twisting occurring in practical use. That is, mode coupling Ma occurs between the modes M1 to M3. This arrangement allows the CC-MCF 100 to have a function as a CM-CC-MCF. At this time, the accumulation of DMD is randomized, so that the accumulating rate of the DMD can be reduced. However, for the CC-MCF 100, if sufficient bending or twisting does not occur in practical use, sufficient mode coupling is less likely to be acquired.

In contrast to this, the CC-MCF 1A according to the present embodiment includes the CC-MCFs 10 and 20 having the transition sections 16 and 26 adjacent to the end faces 10a and 20a. The transition sections 16 and 26 have the respective MFDs of the cores 11 and 21, continuously expanding as approaching the end faces 10a and 20a. This arrangement allows the mode-field overlap between the adjacent cores to increase, so that the mode-coupling coefficient continuously increases to each of the end faces 10a and 20a. Then, the continuous increase of the mode-coupling coefficient generates strong mode coupling Mb. Therefore, the CC-MCF 1A according to the present embodiment, generates sufficient mode coupling even when the CC-MCF 1A is used with bending or twisting less, so that a CM-CC-MCF can be achieved. This arrangement further delays the accumulation of the DMD, so that the DMD can be reduced more effectively. Furthermore, transmission loss due to mode mismatching along the central axis C1 can be reduced. Particularly, crosstalk prescribed by the mode-field overlap between the adjacent cores is preferably −40 dB or more, more preferably −30 ciR or more, for one transition section. A transition section is preferably located at a frequency of 10 to 100 km. This arrangement allows sufficient mode coupling to be made in long-haul transmission from 1000 to 10000 km, so that the uniformity improves in inter-mode optical characteristic.

As in the present embodiment, the lengths of the transition sections 16 and 26 of the CC-MCFs 10 and 20 may be three times or more, ten times or more, or 30 times or more the outer diameters of the claddings 12 and 22. This arrangement can inhibit transmission loss from increasing due to mode mismatching. The mode-field diameters defined in the individual cores 11 and 21 may vary 1.5 times or more, or twice or more in the transition sections 16 and 26. This arrangement can generate the sufficiently strong mode coupling Mb.

As described above, the fusion-connected part between the CC-MCFs 10 and 20 is coated with the recoating 5. The formation of the recoating 5 including the flexible resin enables the transition sections 16 and 26 to be bent. Addition of bending further enhances the strong mode coupling Mb in the transition sections 16 and 26, so that the DMD is further reduced.

Second Embodiment

Figure 3:
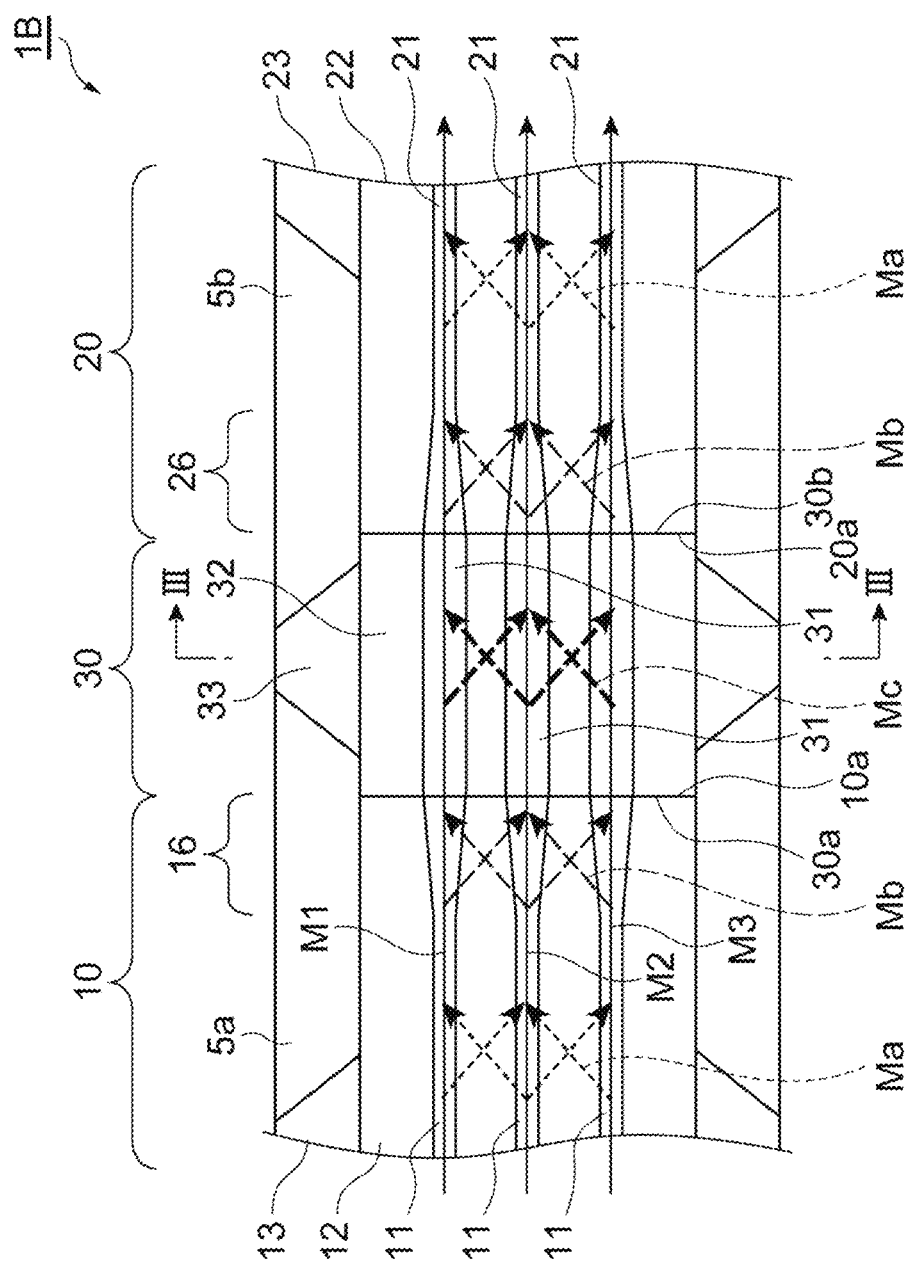
FIG. 3 is a schematic view of the sectional structure along the central axis of a CC-MCF according to a second embodiment.
Figure 4:
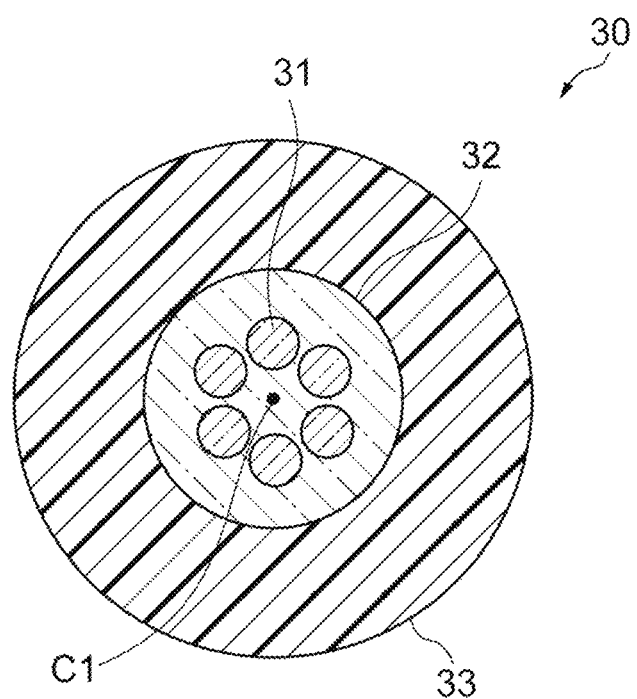
FIG. 4 is a sectional view taken along line III-III of FIG. 3, illustrating an exemplary sectional structure of a third CC-MCF according to the second embodiment.

FIG. 3 is a schematic view of the sectional structure along the central axis of a CC-MCF 1B according to a second embodiment of the present invention. FIG. 4 is a view of an exemplary sectional structure perpendicular to the central axis of a CC-MCF 30 included in the CC-MCF 1B. As illustrated in FIG. 3, the CC-MCF 1B according to the second embodiment includes a CC-MCF 30 (third CC-MCF) corresponding to a third fiber part in addition to CC-MCFs 10 and 20 according to the first embodiment. Note that FIG. 4 is a view of an exemplary sectional structure of the CC-MCF 30 taken along line 111-111 of FIG. 3, the exemplary sectional structure corresponding to the respective sectional structures of the CC-MCFs 10 and 20 (type A of FIG. 2).

As illustrated in FIG. 4, the CC-MCF 30 has: a plurality of cores 31; a single cladding 32 surrounding the plurality of cores 31; and a coating 33 surrounding the single cladding 32. The disposition of the plurality of cores 31 is identical to the disposition of a plurality of cores 11 of the CC-MCF 10 and the disposition of a plurality of cores 21 of the CC-MCF 20. in the example of FIG. 4, six cores 31 corresponding to type A illustrated in FIG. 2, are disposed substantially symmetrically at equiangular intervals around the central axis C1. The cladding 32 and the coating 33 are disposed substantially concentrically. The constituent materials of the cores 31 and the cladding 32 are similar to those of the cores 11 and 21 and claddings 12 and 22 of the CC-MCFs 10 and 20. The constituent material of the coating 33 is similar to those of coatings 13 and 23 of the CC-MCFs 10 and 20.

The cores 31 are larger in diameter than the cores 11 and 21 in stationary sections 15 and 25 of the CC-MCFs 10 and 20. Note that, in the example of FIG. 3, the cores 31 are substantially equal in diameter to the cores 11 and 21 at end faces 10a and 20a of the CC-MCFs 10 and 20. The respective MFDs of the core 31 are 1.5 times or more (more preferably twice or more) the respective MFDs of the cores 11 and the respective MFDs of the cores 21 in the stationary sections 15 and 25 of the CC-MCFs 10 and 20. Note that, in the example of FIG. 3, the respective MFDs of the cores 31 are substantially equal to the respective MFDs of the cores 11 and the respective MFDs of the cores 21 at the end faces 10a and 20a in the CC-MCFs 10 and 20. The mode-coupling coefficient between the adjacent cores 31 in the CC-MCF 30 is 1 [1/m] or more, and is larger than the mode-coupling coefficient between the cores 11 and the mode-coupling coefficient between the cores 21 in the stationary sections 15 and 25. Alternatively, the power-coupling coefficient between the adjacent cores 31 in the CC-MCF 30 is 10 [1/km] or more, and is larger than the power-coupling coefficient between the cores 11 and the power-coupling coefficient between the cores 21 in the stationary sections 15 and 25. As an example, the mode-coupling coefficient (or power-coupling coefficient) between the cores 31 is substantially equal to the mode-coupling coefficient (or power-coupling coefficient) between the cores 11 and the mode-coupling coefficient (or power-coupling coefficient) between the cores 21 at the end faces 10a and 20a of the CC-MCFs 10 and 20.

The cladding 32 is equal in outer diameter to the claddings 12 and 22 of the CC-MCFs 10 and 20. The coating 33 is equal in outer diameter to the coatings 13 and 23 of the CC-MCFs 10 and 20.

The end face 10a of the CC-MCF 10 (connected end face) is connected to an end face 30a of the CC-MCF 30 (first fiber end face), and the end face 20a of the CC-MCF 20 (connected end face) is connected to an end face 30b of the CC-MCF 30 (second fiber end face). This arrangement allows the cores 11 at the end face 10a and the cores 21 at the end face 20a to be connected mutually indirectly through the cores 31 of the CC-MCF 30. That is, the cores 11 and the cores 21 are optically connected one by one through the CC-MCF 30.

The end face 30a of the CC-MCF 30 and the end face 10a of the CC-MCF 10 are mutually connected by, for example, fusing with adjustment in angle around the central axis C1. This arrangement allows the cores 31 at the end face 30a and the cores 11 at the end face 10a to be mutually directly connected. Note that the coatings 13 and 33 are removed, for the fusion-connection, from a section having a predetermined length, including the end faces 10a and 30a. However, after the fusion-connection, a recoating 5a including ultraviolet curable resin is formed on the section from which the coatings 13 and 33 have been removed, so that the recoating 5a coats a fusion-connected part.

The end face 30b of the CC-MCF 30 and the end face 20a of the CC-MCF 20 are mutually connected by, for example, fusing with adjustment in angle around the central axis C1. This arrangement allows the cores 31 at the end face 30b and the cores 21 at the end face 20a to be mutually directly connected. Note that the coatings 23 and 33 are removed, for the fusion-connection, in a section having a predetermined length, including the end face 30b and the end face 20a. However, after the fusion-connection, a recoating 5b is formed on the section from which the coatings 23 and 33 have been removed, so that the recoating 5b coats a fusion-connected part.

In the CC-MCF 1B having the structure described above, similarly to the first embodiment, mode coupling Ma between modes M1 to M3 occurs in the stationary sections 15 and 25 of the CC-MCFs 10 and 20 and stronger mode coupling Mb occurs in transition sections 16 and 26. In addition, in the present embodiment, further stronger mode coupling Mc occurs between the modes M1 to M3 in the CC-MCF 30. This arrangement allows substantially complete mode coupling to occur between the transition section 16, the CC-MCF 30, and the transition section 26. Therefore, the group delay difference or the transmission loss difference between the cores included in the CC-MCFs 10 and 20, is dispersed into all the modes, so that the influence of variation in core characteristic can be reduced. The CC-MCF 30 has the MFD and the mode-coupling coefficient equivalent to the expanded MFDs and the mode-coupling coefficients at the end faces 10a and 20a of the CC-MCFs 10 and 20, so that transmission loss can be inhibited from increasing due to mode mismatching.

In the present embodiment, similarly to the first embodiment, the formation of the recoatings 5a and 5b for enabling the transition sections 16 and 26 to be bent, further enhances the mode coupling, so that a further reduction can be made in DMD.

Third Embodiment

Figure 5:
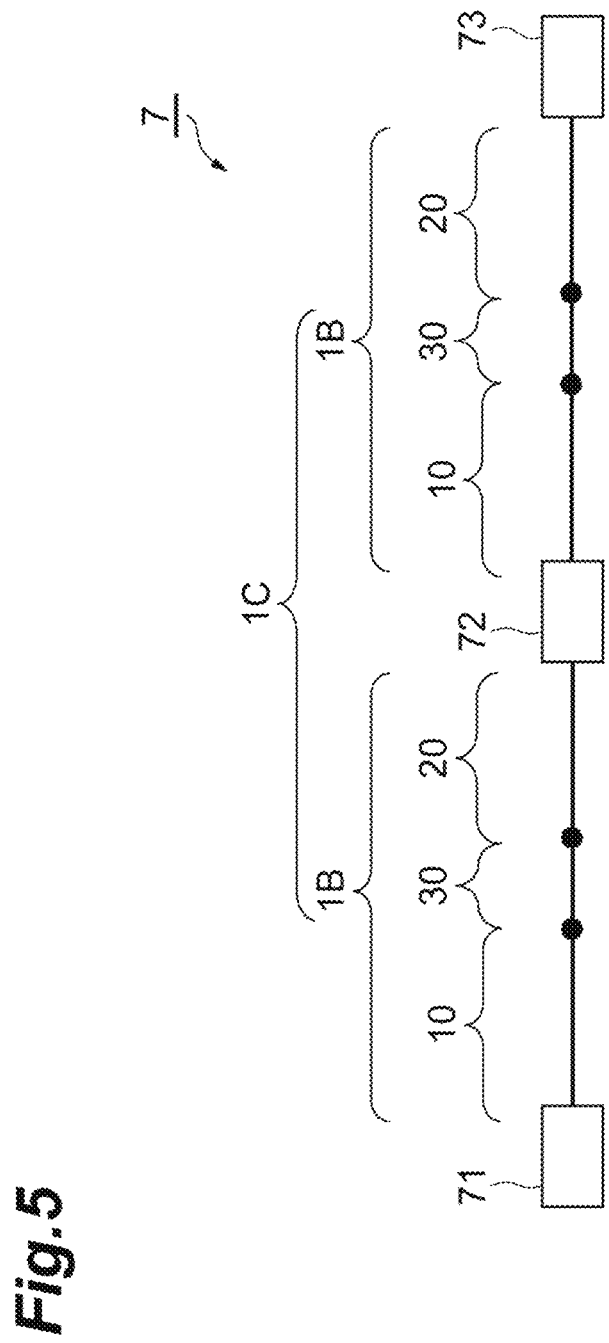
FIG. 5 is a schematic diagram of the configuration of an optical transmission system according to a third embodiment.

FIG. 5 is a schematic diagram of the configuration of an optical transmission system 7 according to a third embodiment of the present invention. As illustrated in FIG. 5, the optical transmission system 7 includes an optical transmitter 71, an optical amplifier 72, an optical receiver 73, and a CC-MCF 1C. The optical transmitter 71 outputs a modulated optical signal La. The optical amplifier 72 amplifies the optical signal La. For example, the optical amplifier 72 inputs pumping light into silica glass doped with erbium and forms population inversion, to amplify light in a plurality of modes to be guided.

The CC-MCF 1C optically couples the optical transmitter 71 and the optical receiver 73 through the optical amplifier 72. Note that, in the example of FIG. 5, the CC-MCF 1C includes two CC-MCFs 1B according to the second embodiment. One CC-MCF 1B optically couples the optical transmitter 71 and the optical amplifier 72, to propagate the optical signal La output from the optical transmitter 71 to the optical amplifier 72, the optical signal La being subjected to mode coupling. The other CC-MCF 1B optically couples the optical amplifier 72 and the optical receiver 73, to propagate the amplified optical signal La output from the optical amplifier 72 to the optical receiver 73, the amplified optical signal La being further subjected to mode coupling.

The optical receiver 73 receives the amplified optical signal La. For example, the optical receiver 73 performs coherent detection with interference between the optical signal La subjected to the mode coupling and local oscillation light having a substantially equal optical frequency, to correct dispersion and the influence of non-linear distortion with digital signal processing and to restore the optical signal La before the mode coupling with MIMO signal processing.

The optical transmission system 7 including the CC-MCF 1C according to the present embodiment, suppresses the accumulation of DMD low even in long-haul transmission and reduces the computational complexity of the MIMO signal processing in the optical receiver 73. As a result, signal delay and power consumption due to the signal processing are reduced. Note that the CC-MCF 1C may include a CC-MCF 1A according to the first embodiment instead of at least one of the CC-MCFs 1B.

The coupled multicore optical fiber according to the present invention is not limited to the embodiments described above, and thus various modifications can be made. For example, the embodiments described above may be combined mutually for a necessary object and effect.

REFERENCE SIGNS LIST 1A to 1C . . . CC-MCF; 5, 5a, 5b . . . recoating; 7 . . . optical transmission system; 10 . . . first CC-MCF; 11, 21, 31 . . . core; 12, 22, 32 . . . cladding; 13, 23, 33 . . . coating; 15, 25 . . . stationary section; 16, 26 . . . transition section; 20 . . . second CC-MCF; 30 . . . third CC-MCF; 71 . . . optical transmitter; 72 . . . optical amplifier; 73 . . . optical receiver; C1 . . . central axis; La . . . optical signal; M1 to M3 . . . mode; and Ma, Mb, Mc . . . mode coupling.

The invention claimed is:

1. A coupled multicore optical fiber comprising:
   a first fiber part and a second fiber part, each of the first fiber part and the second fiber part having:
   a plurality of cores extending along a central axis;
   a single cladding surrounding the plurality of cores;
   a coating surrounding the single cladding; and
   a connected end face at which respective first end faces of the plurality of cores are disposed,
   wherein
   the first end faces of the plurality of cores in the first fiber part are mutually directly or indirectly connected to the first end faces of the plurality of cores in the second fiber part,
   in each of the first fiber part and the second fiber part, a pair of adjacent cores in the plurality of cores has a mode-coupling coefficient of 1 [1/m] or more,
   the first fiber part and the second fiber part each have a transition section including the connected end face and a stationary section disposed adjacently to the transition section along the central axis,
   the stationary section has respective mode-field diameters of the plurality of cores, substantially constant along the central axis, and
   the transition section has the respective mode-field diameters of the plurality of cores, continuously expanding from the stationary section to the connected end face.

2. The coupled multicore optical fiber according to claim 1, wherein
   in at least one of the first fiber part and the second fiber part, a length of the transition section is three times or more an outer diameter of the single cladding, and the respective mode-field diameters at the connected end face of the plurality of cores in the transition section are 1.5 times or more the respective mode-field diameters of the plurality of cores in the stationary section.

3. The coupled multicore optical fiber according to claim 1, further comprising a third fiber part having:
   a first fiber end face;
   a second fiber end face opposed to the first fiber end face;
   a plurality of cores extending from the first fiber end face to the second fiber end face;
   a single cladding surrounding the plurality of cores; and
   a coating surrounding the single cladding,
   wherein
   the plurality of cores has respective first end faces disposed on the first fiber end face and respective second end faces disposed on the second fiber end face,
   in the third fiber part, a pair of adjacent cores in the plurality of cores has a mode-coupling coefficient of 1 [1/m] or more,
   the first end faces of the plurality of cores in the third fiber part are mutually directly connected to the first end faces of the plurality of cores in the first fiber part,
   the second end faces of the plurality of cores in the third fiber part are mutually directly connected to the first end faces of the plurality of cores in the second fiber part, and
   respective mode-field diameters of the plurality of cores in the third fiber part are substantially equal to the respective mode-field diameters at the connected end face of the plurality of cores in the first fiber part and the respective mode-field diameters at the connected end face of the plurality of cores in the second fiber part.

4. The coupled multicore optical fiber according to claim 1, wherein
   in each of the first fiber part and the second fiber part, each of the plurality of cores is comprised of silica glass, the single cladding is comprised of silica glass doped with fluorine, and the coating is comprised of ultraviolet curable resin, and
   a fluorine distribution of the transition section in each of the first fiber part and the second fiber part, varies along the central axis.

5. The coupled multicore optical fiber according to claim 4, further comprising a recoating comprised of ultraviolet curable resin, the recoating being disposed on an edge section of each of the first fiber part and the second fiber part, the edge section including the transition section and part of the stationary section adjacent to the transition section, the edge section having part of the coating removed, the edge section having a breaking strength of 200 kgf or more.

6. The coupled multicore optical fiber according to claim 3, wherein
   in each of the first fiber part, the second fiber part, and the third fiber part, each of the plurality of cores is comprised of silica glass, the single cladding is comprised of silica glass doped with fluorine, and the coating is comprised of ultraviolet curable resin, and
   a fluorine distribution of the transition section in each of the first fiber part and the second fiber part, varies along the central axis.

7. The coupled multicore optical fiber according to claim 6, further comprising a recoating comprised of ultraviolet curable resin, the recoating being disposed on an edge section of each of the first fiber part and the second fiber part, the edge section including the transition section and part of the stationary section adjacent to the transition section, the edge section having part of the coating removed, the edge section having a breaking strength of 200 kgf or more.

8. An optical transmission system comprising:
   an optical transmitter configured to output an optical signal modulated;
   an optical receiver configured to receive the optical signal; and
   the coupled multicore optical fiber according to claim 1, the coupled multicore optical fiber optically coupling the optical transmitter and the optical receiver,
   wherein
   the coupled multicore optical fiber transmits the optical signal and gives mode coupling to the optical signal, simultaneously, and
   the optical receiver performs coherent detection to the optical signal subjected to the mode coupling and restores, with MIMO signal processing, the optical signal before the mode coupling.

* * * * *